A. MICHELIN.
REMOVABLE RIM FOR THE WHEELS OF VEHICLES.
APPLICATION FILED DEC. 30, 1907.

967,536.

Patented Aug. 16, 1910.

2 SHEETS—SHEET 1.

A. MICHELIN.
REMOVABLE RIM FOR THE WHEELS OF VEHICLES.
APPLICATION FILED DEC. 30, 1907.

967,536.

Patented Aug. 16, 1910.
2 SHEETS—SHEET 2.

Witnesses:
Henry Thieme.
F. George Barry.

Inventor:—
André Michelin
by attorneys

UNITED STATES PATENT OFFICE.

ANDRÉ MICHELIN, OF PARIS, FRANCE.

REMOVABLE RIM FOR THE WHEELS OF VEHICLES.

967,536.   Specification of Letters Patent.   Patented Aug. 16, 1910.

Application filed December 30, 1907. Serial No. 408,474.

*To all whom it may concern:*

Be it known that I, ANDRÉ MICHELIN, a citizen of the Republic of France, and resident of 105 Boulevard Péreire, Paris, in the said Republic, engineer, have invented new and useful Improvements in Removable Rims for the Wheels of Vehicles, of which the following is a specification.

The invention relates to an arrangement permitting of the rapid removal from a wheel of the rim the pneumatic tire on which is no longer in good condition, and its rapid replacement by a new rim fitted with a pneumatic tire inflated in advance.

It consists in providing, a slanting part on one edge of a hoop fixed to the wheel and in arranging on this slanting part a device composed of keys which follow its form and are capable of displacement in an oblique direction in such a manner that as they move outward they approach the center of the wheel, thus leaving the way free for causing the removable rim and tire to slide off of the wheel; whereas if the keys are forced to move in the opposite direction they are caused to bear against the underside of the rim which has been placed on the wheel, so as to fix it in its position.

The invention comprises also means for producing the oblique advance and retirement of the keys.

The object of this invention is to secure the following advantages, viz: 1st, the removable rim may be constructed comparatively cheaply because it does not have a close sliding fit with the felly and consequently neither it nor the felly need be turned or ground to a smooth surface. 2nd, the removable rim may be put on and taken off without removing from the wheel the devices which secure the removable rim in place.

Figure 1:
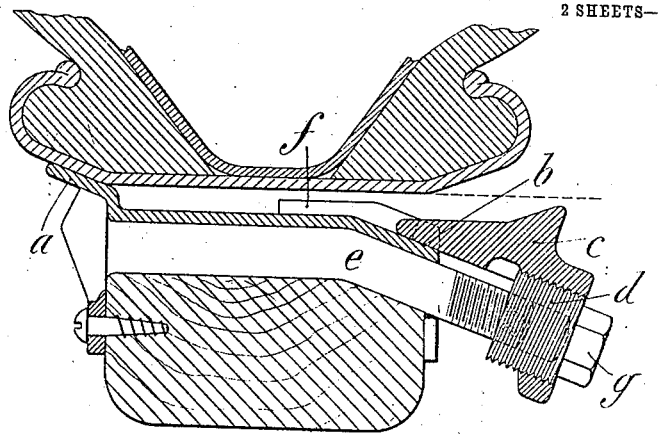
Figure 3:
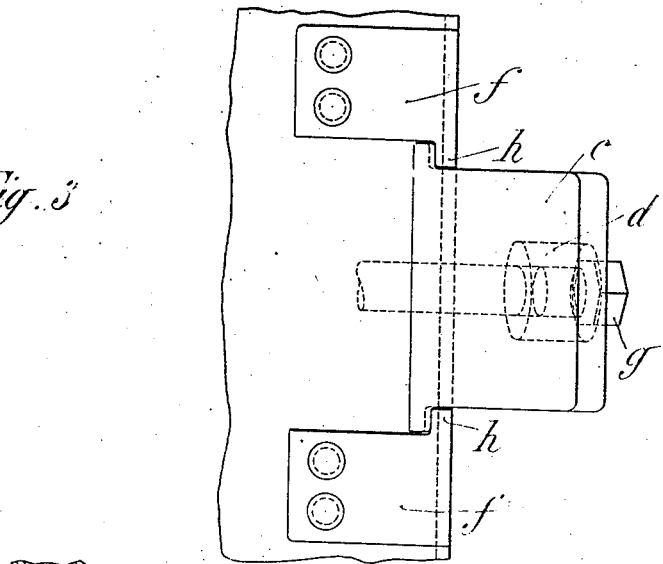
Figure 2:
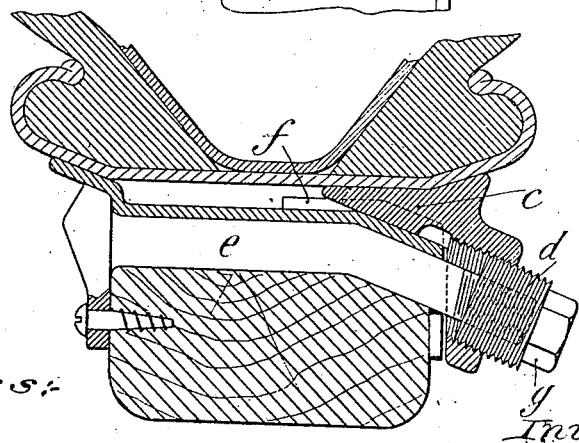
Figure 4:
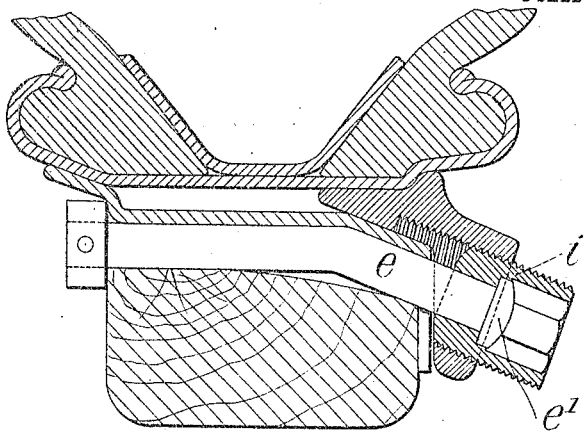
Figure 5:
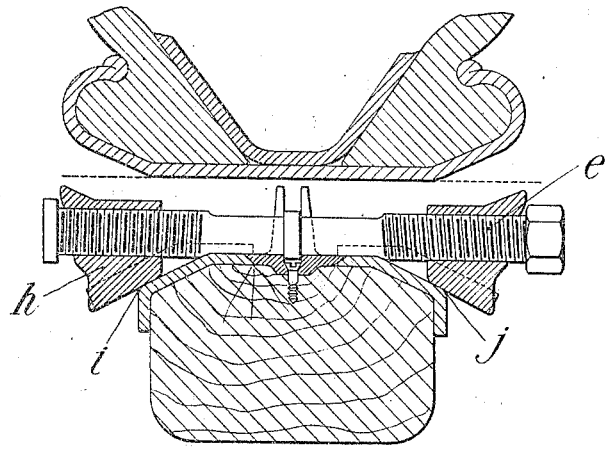
Figure 6:
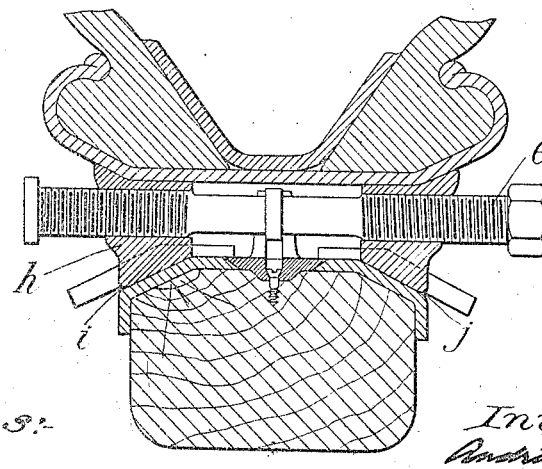

In the accompanying drawings, Figure 1 is a transverse section showing a removable rim mounted on a wooden wheel with the fixing key displaced for permitting the removal of this rim. Fig. 2 is a similar view, showing the key in position for fixing the rim firmly on the wheel. Fig. 3 is a plan view corresponding to Fig. 1. Fig. 4 is a transverse section illustrating a modification of means for operating the keys. Figs. 5 and 6 are transverse sections showing a modification in which the keys are arranged on the two sides of the felly, in pairs.

In the arrangement shown in Figs. 1, 2 and 3, the wheel is provided with a steel hoop having an edge $a$ to act as a stop for the tire rim on the inner side of the vehicle, and terminating on the opposite side in a conical surface $b$, owing to which the keys $c$, the number of which is eight for example, may be moved away from or toward the center of the wheel, sliding between two guides $f$ in a line generatrix to the cone. When they are removed away from the center of the wheel, these keys support and retain the rim of the pneumatic tire; when moved toward the center, they permit the tire rim to be withdrawn and replaced (see Fig. 1).

The movement of each of the keys is produced in the following manner:—The key $c$ constitutes a nut on a screw $d$; the latter in its turn forms a nut on the bolt $e$ with its thread of opposite pitch. In this manner, by turning the screw $d$ by means of a bed key or box spanner engaging its head $g$, the key $c$ is caused to move in the direction of an inclined plane, that is to say following the axis of the screw, in relation to the screw $d$ and, moreover, the screw $d$ in relation to the bolt $e$; whence, for each turn of the screw $d$, the key moves in an inclined plane a distance equal to the sum of the two travels. This system therefore possesses the advantage of being extremely rapid.

In the drawing, the screw $d$ being of a pitch of 1.5 millimeters to the left and the bolt $e$ of a pitch of 1.5 millimeters to the right, in each revolution to the left imparted to the screw the key $c$ will be withdrawn 3 millimeters, in an inclined plane and toward the center of the wheel, and inversely turning to the right. For dismounting the pneumatic tire rim, each of the screws is turned to the left by the box spanner, until the corresponding key abuts against the flanges $h$ of the guides $f$; in this position, the keys are withdrawn from contact with the rim and carried sufficiently toward the center of the wheel to permit of the free passage of the pneumatic tire rim (Fig. 1). A new rim fitted with its pneumatic tire being placed in position, the screws are turned to the right by the box spanner, carrying the keys into contact with the rim, and they retain it by an edge which is inclined or straight according to its form (Fig. 2). The movement of each of the keys may however be effected by any known mechanical means for advancing and withdrawing keys.

Fig. 4 illustrates a modification consisting in the employment of a simple screw $i$ secured by a collar $e'$ on the bolt $e$. Further, the arrangement shown in Figs. 5 and 6, based on the same principle, may be employed, in which the hoop used has a conical surface on each side and two series of symmetrical keys are used. In this arrangement the bolt $e$ is straight; its two extremities are screw-threaded to opposite pitches so as to produce the simultaneous advance or withdrawal of these two keys; these latter ascend or descend the two inclined planes $i$ and $j$, sliding between two guides of dovetail form.

It will be understood that various changes may be resorted to in the form, construction and arrangement of the several parts without departing from the spirit and scope of my invention.

What I claim as my invention and desire to secure by Letters Patent, is:—

1. An apparatus of the character described comprising a wheel, a fixed hoop thereon having a part inclined toward the center of the wheel, keys located on said inclined part, the internal surface of which keys corresponds in shape to the inclined part of the hoop while their external surface corresponds in shape to the removable rim which the wheel is to carry, and means for causing these keys to move in the plane of the axis of the wheel along the inclined part of the hoop away from or toward the center of the wheel so as to either engage the removable rim or withdraw from said engagement for permitting the rim to be removed from the wheel.

2. An apparatus of the character described comprising a wheel, a fixed hoop thereon having a part inclined toward the center of the wheel, keys located on said inclined part, the internal surface of which keys corresponds in shape to the inclined part of the hoop while their external surface corresponds in shape to the removable rim which the wheel is to carry, guides for the keys and inclined bolts fixed to the wheel, and means carried by said bolts for causing the keys to move in the plane of the axis of the wheel along the inclined part of the hoop away from or toward the center of the wheel so as to either engage the removable rim or withdraw from said engagement for permitting the rim to be removed from the wheel.

3. An apparatus of the character described comprising a wheel, a fixed hoop thereon having a part inclined toward the center of the wheel, keys located on said inclined part, the internal surface of which keys corresponds in shape to the inclined part of the hoop while their external surface corresponds in shape to the removable rim which the wheel is to carry, guides for the keys, inclined bolts fixed to the wheel, nuts having a screw-threaded engagement with the bolts and with the keys for causing these keys to move in the plane of the axis of the wheel along the inclined part of the hoop away from or toward the center of the wheel so as to either engage the removable rim or withdraw from said engagement for permitting the rim to be removed from the wheel.

4. An apparatus of the character described comprising a wheel, a fixed hoop thereon having a part inclined toward the center of the wheel, keys located on said inclined part, the internal surface of which keys corresponds in shape to the inclined part of the hoop while their external surface corresponds in shape to the removable rim which the wheel is to carry, guides for the keys, inclined bolts fixed to the wheel, nuts having a screw-threaded engagement with the bolts and a screw-threaded engagement of opposite pitch with the keys for causing the keys to move rapidly in the plane of the axis of the wheel along the inclined part of the hoop away from or toward the center of the wheel so as to either engage the removable rim or withdraw from said engagement for permitting the rim to be removed from the wheel.

In testimony, that I claim the foregoing as my invention, I have signed my name in presence of two witnesses, this sixteenth day of December 1907.

ANDRÉ MICHELIN.

Witnesses:
  HANSON C. COXE,
  ALCIDE FABT